United States Patent Office
3,576,802
Patented Apr. 27, 1971

3,576,802
DISUBSTITUTED OXETANES AND PROCESS FOR THEIR MANUFACTURE
Walter Lüders, Neu-Isenburg, Günter Messwarb, Kelkheim, Taunus, and Herbert Maar and Hartmut Steppan, Wiesbaden, Germany, assignors to Kalle Aktiengesellschaft, Wiesbaden-Biebrich, Germany
No Drawing. Filed July 2, 1968, Ser. No. 741,864
Claims priority, application Germany, July 6, 1967,
P 16 43 323.1
Int. Cl. C07d 3/00
U.S. Cl. 260—240
7 Claims

ABSTRACT OF THE DISCLOSURE

Polymerizable 3,3-disubstituted oxetanes of the formula

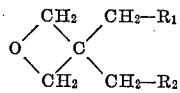

wherein at least one of $R_1$ and $R_2$ is an unsaturated group capable of dimerization under the influence of light. A method of making such compounds from precursors having one or two halomethyl groups in the 3-position.

---

The present invention relates to 3,3-disubstituted oxetanes and to methods of making the same.

In many fields of chemistry, organic compounds having a multivalent, selective reactivity are of extreme importance for overcoming important technical problems. There are mentioned, by way of example only those unsaturated compounds which contain reactive groups in their molecules, for example methylol, glycidyl or isocyanate groups.

The present invention provides a method for producing novel bifunctional compounds, in the molecules of which a reactive oxetane ring is combined with a grouping that can be dimerized under the action of light. Compounds of this kind have not yet been disclosed. The specific possibilities of reaction of the two groupings combined in the compounds of the invention are known.

Oxetanes can be readily reacted, with or without a catalyst, with H-acid compounds, for example water, alcohols, phenols, hydrogen sulfide, mercaptans and inorganic acids and salts.

On the other hand, in reproduction techniques, use has been made of the dimerizability of cinnamic acid and chalcone groupings with the aid of light of different wave length for photo-chemical reactions. It is known that reactions of this type can be favorably influenced by sensitizers.

3,3-disubstituted oxetanes have now been found of the formula (I) 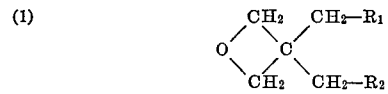

in which $R_1$ stands for a mono- or polyunsaturated aromatically substituted carboxylate radical or a benzoylbenzoxy radical or a substituted phenoxy radical of the general formula (II) 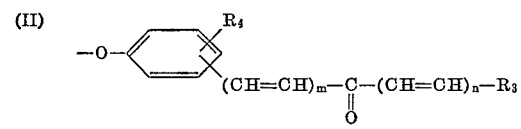

$R_2$ has the same meaning as $R_1$ or represents an alkyl radical, an alkoxy radical, an aryloxy radical, a benzoylphenoxy radical, or a chlorine atom; $R_3$ is hydrogen, methyl, or phenyl when $m$ and $n$ are zero, is β-chlorostyryl or β-phenylstyryl when $m$ is zero and $n$ is 1, and is a possibly substituted carbocyclic or heterocyclic aromatic radical when $m$ is zero or 1 and $n$ is an integer from 1 to 6; and $R_4$ represents a hydrogen atom or halogen atom or an alkyl or alkoxy radical. The method for making these compounds comprises reacting an oxetane having a halomethyl substituent and an alkyl, alkoxymethyl, aryloxymethyl or benzoylphenoxymethyl substituent or two halomethyl substituents in the 3 position with an alkali metal salt of a mono- or polyunsaturated, aromatically substituted carboxylic acid or benzoylbenzoic acid, or with an alkali metal phenolate of a hydroxybenzaldehyde, hydroxyacetophenone or hydroxybenzophenone which may be substituted with a halogen atom or an alkyl or alkoxy radical, and condensing the reaction product so obtained, possibly via the acetyl or formyl-phenoxy group, with an aromatic aldehyde which may carry as substituents alkyl, alkoxy, nitro or azido groups, or with an aliphatic aldehyde substituted with aromatic radicals and possibly halogen atoms and having one or several carbon-carbon double bonds conjugated with the carbonyl function, or with a methylaryl ketone or methylalkenyl ketone having one or several carbon-carbon double bonds conjugated with the carbonyl function and possibly carrying aromatic substituents.

Suitable oxetane derivatives are, for example 3-methyl-3-chloromethyloxetane,
3-methyl-3-bromomethyloxetane,
3-methyl-3-iodomethyl-oxetane,
3-ethyl-3-chloromethyloxetane,
3-ethyl-3-bromomethyloxetane,
3-ethyl-3-iodomethyloxetane,
3,3-bischloromethyloxetane,
3,3-bisbromomethyloxetane, or
3,3-bisiodomethyloxetane.

Alkali metal phenolates that can be used are preferably 2-hydroxyacetophenone,
3-hydroxyacetophenone,
4-hydroxyacetophenone,
2-hydroxybenzophenone,
3-hydroxybenzophenone,
4-hydroxybenzophenone,
2-hydroxybenzaldehyde,
3-hydroxybenzaldehyde, or
4-hydroxybenzaldehyde.

The reaction can be performed in the absence or presence of diluents, such as dimethyl formamide, or dimethyl sulfoxide. The reactants are allowed to react with one another for 2 to 48 hours at a temperature in the range of from 50 to 200° C., advantageously 70 to 150° C., the solution is separated by filtration from the inorganic salt formed and the diluent and/or the oxetane used in excess are removed by distillation under reduced pressure.

If in Formula I $R_1$ and/or $R_2$ stand for an acetylphenoxy radical, the oxetane may be condensed with an aromatic aldehyde which may carry alkyl, alkoxy, nitro or azido groups, or with an aliphatic aldehyde carrying as substituents aromatic radicals and possibly halogen atoms and having one or several carbon-carbon double bonds conjugated with the carbonyl function. In this manner compounds of the following formulae are obtained

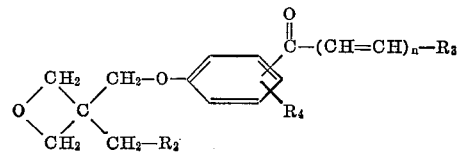

and

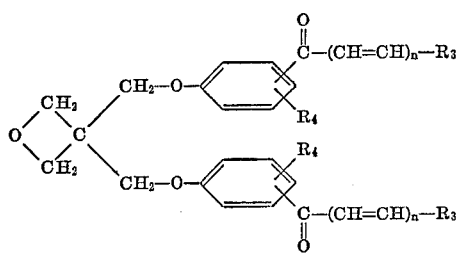

in which $R_2$ and $R_4$ have the meanings indicated above and $R_3$ stands for a possibly substituted carbocyclic or heterocyclic aromatic radical.

In case $R_1$ and/or $R_2$ in Formula I stand for a formylphenoxy group, the condensation reaction may be carried out with a methylaryl ketone or a methylalkenyl ketone having one or several carbon-carbon double bonds conjugated with the carbonyl function and possibly carrying aromatic substituents. Compounds of the general formulae

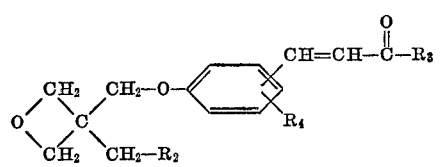

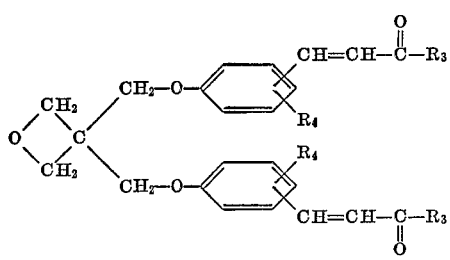

are obtained in which $R_3$ stands for a possibly substituted carbocyclic or heterocyclic aromatic radical and $R_2$ and $R_4$ have the meaning indicated above.

The condensation is carried out in known manner in a medium made alkaline with sodium hydroxide by dissolving the two reactants in an organic solvent, preferably an alcohol or ether, adding the stoichiometric amount of dilute aqueous or methanolic sodium hydroxide solution at a temperature of from 10 to 30° C., preferably 15 to 25° C., while stirring, further stirring the reaction mixture for 1 to 8 hours, preferably 3 to 5 hours, filtering off the solid reaction product with suction and recrystallizing it from a suitable solvent.

The present invention also provides oxetanes substituted in 3-position of the general formula (I)
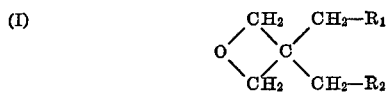

in which $R_1$ stands for mono- or polyunsaturated aromatically substituted carboxylate radical or a benzoylbenzoxy radical or a substituted phenoxy radical of the general formula (II)
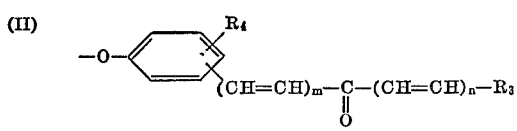

$R_2$ has the same meaning as $R_1$ or represents an alkyl, alkoxy, aryloxy or a benzoylphenoxy group or a chlorine atom $R_3$ is hydrogen, methyl, or phenyl when $m$ and $n$ are zero, is β-chlorostyryl or β-phenylstyryl if $m$ is zero and $n$ is 1, and is a possibly substituted carbocyclic or heterocyclic aromatic radical when $m$ is zero or 1 and $n$ is an integer from 1 to 6. $R_4$ stands for a hydrogen or halogen atom or an alkyl or alkoxy radical.

The novel compounds of the invention represent valuable intermediates which can be further reacted, for example they can be polymerized with opening of the oxetane ring.

The following examples serve to illustrate the invention but they are not intended to limit it thereto, the parts and percentages being by weight unless otherwise stated.

EXAMPLE 1

46 parts of potassium cinnamate and 19 parts of 3,3-bischloromethyloxetane were stirred for 24 hours at 70° C. in 100 parts of dimethylsulfoxide.

After cooling, the potassium chloride was filtered off and the dimethyl sulfoxide was removed from the filtrate by distillation under reduced pressure. The solid residue was dissolved in 50 parts of methylene chloride and precipitated again with 200 parts of petroleum ether.

Yield—77%
Melting point—96° C.

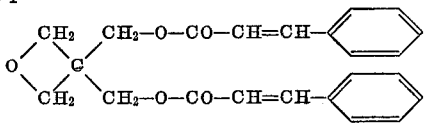

*Analysis.*—Calculated for $C_{23}H_{22}O_5$ (percent): C, 73.0; H, 5.9. Found (percent): C, 72.5; H, 6.2.

The structure of the compound was verified by the nuclear magnetic resonance spectrum (NMR-spectrum).

EXAMPLE 2

100 parts of the potassium salt of p-hydroxyacetophenone and 250 parts of 3,3-bischloromethyloxetane were stirred for 3 hours at 140° C. After cooling, the potassium chloride was filtered off and the excess of 3,3-bischloromethyloxetane was removed from the filtrate by distillation under reduced pressure. The solid residue was recrystallized from petroleum ether.

Yield—70%
Melting point—83° C.

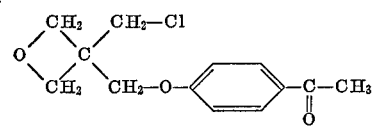

*Analysis.*—Calculated for $C_{13}H_{15}ClO_3$ (percent): C, 61.2; H, 5.9; Cl, 13.9. Found (percent): C, 61.2; H, 5.9; Cl, 12.9.

12.7 parts of the 3-chloromethyl-3-(p-acetyl)-phenoxymethyl-oxetane and 7.6 parts of p-isopropylbenzaldehyde were dissolved in 200 parts of ethanol. 30 parts of 2 N sodium hydroxide solution were dropped in at room temperature while stirring, the reaction mixture was stirred for 6 hours at room temperature and then cooled to 0° C. The solid product was filtered off with suction, washed with water and recrystallized from isopropanol.

Yield—72%
Melting point—96–97° C.

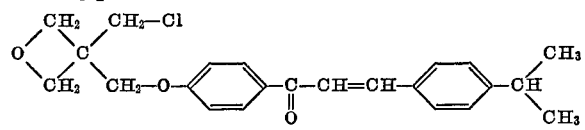

*Analysis.*—Calculated for $C_{23}H_{25}ClO_3$ (percent): C, 71.8; H, 6.5; Cl, 9.2. Found (percent): C, 71.1; H, 6.5; Cl, 9.1.

EXAMPLE 3

Over a period of 40 minutes, 50 parts of 3 N sodium hydroxide were added dropwise, at room temperature, and with stirring, into a solution of 29 parts of 3-chloromethyl - 3 - (p-acetyl)-phenoxymethyl-oxetane and 18.5 parts of 4 - methoxycinnamic aldehyde in 100 parts of ethanol. The reaction mixture was stirred for another 3 hours at room temperature, the separated precipitate was filtered off with suction, dried and recrystallized from ethanol.

Yield—75%
Melting point—102° C.

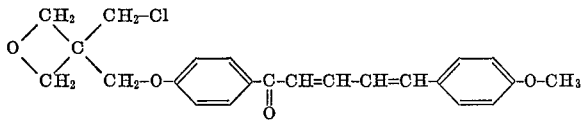

*Analysis.*—Calculated for $C_{23}H_{23}ClO_4$ (percent): C, 69.4; H, 6.9; Cl, 8.9. Found (percent): C, 69.2; H, 6.8; Cl, 9.0.

EXAMPLE 4

100 parts of the sodium salt of p-hydroxyacetophenone and 250 parts of 3-ethyl-3-chloromethyloxetane were stirred for 36 hours at 140° C. After cooling, the sodium chloride was filtered off and the excess of 3-ethyl-3-chloromethyloxetane was removed from the filtrate by distillation under reduced pressure. The solid residue was recrystallized from petroleum ether.

Yield—70%
Melting point—60° C.

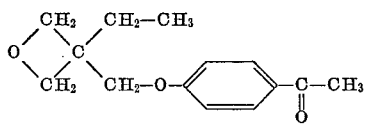

*Analysis.*—Calculated for $C_{14}H_{18}O_3$ (percent): C, 75.1; H, 6.9. Found (percent): C, 74.8; H, 6.9.

45 parts of the 3-ethyl-3-(p-acetyl)-phenoxymethyloxetane obtained and 23.8 parts of β-[furyl-(2)]-acrolein were dissolved in 120 parts of ethanol and 80 parts of 3 N sodium hydroxide solution were added to the solution dropwise at room temperature while stirring. The reaction mixture was stirred for 6 hours at room temperature and then cooled to 0° C. The solid product was filtered off with suction, washed with water and recrystallized from methanol.

Yield—76%
Melting point—75° C.

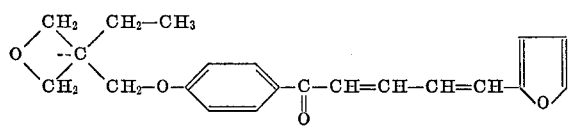

*Analysis.*—Calculated for $C_{21}H_{22}O_4$ (percent): C, 74.5; H, 6.5. Found (percent): C, 74.7; H, 6.6.

EXAMPLE 5

Over a period of 30 minutes, 20 parts of 2 N sodium hydroxide were added dropwise, at room temperature and with stirring, to a solution of 11.7 parts of 3-ethyl-3-(p-acetyl)-phenoxymethyloxetane and 10.3 parts of α-phenylcinnamic aldehyde in 220 parts of ethanol. The reaction mixture was stirred for another 3 hours at room temperature and then cooled to 0° C. The precipitate was filtered off with suction and recrystallized from ethanol.

Yield—40%
Melting point—157° C.

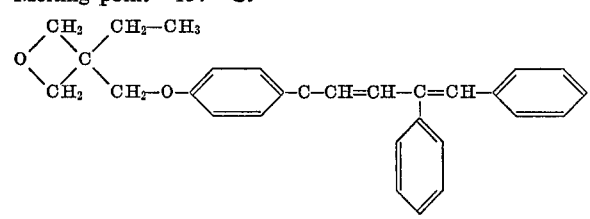

*Analysis.*—Calculated for $C_{29}H_{28}O_3$ (percent): C, 82.0; H, 6.6. Found (percent): C, 81.8; H, 6.6.

EXAMPLE 6

17 parts of 2 N sodium hydroxide solution were dropped at room temperature while stirring into a solution of 13.2 parts of 3-ethyl-3-(p-acetyl)-phenoxymethyloxetane and 10 parts of o-nitrocinnamic aldehyde in 650 parts of ethanol and 50 parts of dioxan. The reaction mixture was stirred for another 7 hours at room temperature, the solution was concentrated under reduced pressure to a volume of 100 milliliters and cooled to 0° C. The precipitate was filtered off with suction and recrystallized from ethanol.

Yield—37%
Melting point—120° C.

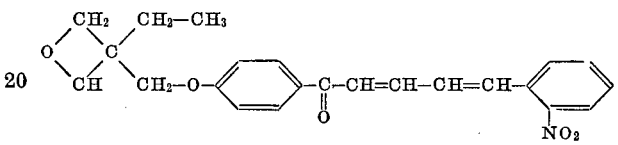

*Analysis.*—Calculated for $C_{23}H_{23}NO_5$ (percent): C, 70.0; H, 5.9; N, 3.6. Found (percent): C, 69.7; H, 6.1; N, 3.9.

EXAMPLE 7

348 parts of the potassium salt of p-hydroxyacetophenone and 155 parts of 3,3-bischloromethyloxetane were stirred for 3 hours at 150° C. The mixture was cooled, 300 parts of methylene chloride were added and the potassium chloride was filtered off. After removal of the methylene chloride the solid residue was recrystallized from ethanol.

Yield—77%
Melting point—125° C.

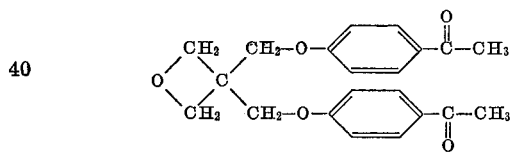

*Analysis.*—Calculated for $C_{21}H_{22}O_5$ (percent): C, 71.2; H, 6.2. Found (percent): C, 71.0; H, 6.2.

8.9 parts of the 3,3 - bis-(p-acetyl-phenoxymethyl)-oxetane obtained and 10 parts of 7-phenyl-heptatriental were dissolved in 400 parts of ethanol and 20 parts of 3 N sodium hydroxide solution were dropped in at room temperature while stirring. The reaction mixture was stirred for 6 hours at room temperature and cooled to 0° C. The solid product was filtered off with suction, washed with water and recrystallized from dioxan.

Yield—42%
Melting point—198° C.

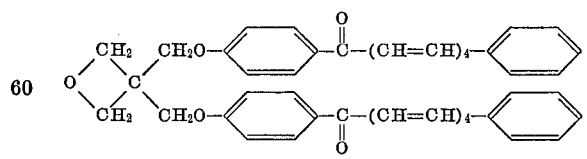

*Analysis.*—Calculated for $C_{47}H_{42}O_5$ (percent): C, 82.1; H, 6.1. Found (percent): C, 81.6; H, 6.1.

EXAMPLE 8

15 parts of 2 N methanolic sodium hydroxide solution were dropped at room temperature while stirring into a solution of 4.5 parts of 3,3-bis-(p-acetyl-phenoxymethyl)-oxetane and 4 parts of m-azidobenzaldehyde in 90 parts of dioxan. The reaction mixture was stirred for another 3 hours at room temperature, the precipitate was filtered off with suction, washed with water and recrystallized from ethanol.

Yield—71%
Melting point—156–158° C.

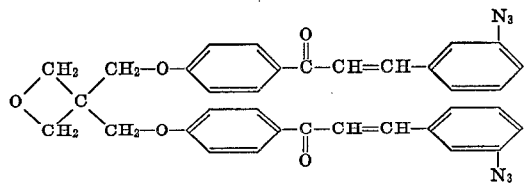

*Analysis.*—Calculated for $C_{35}H_{28}N_6O_5$ (percent): C, 68.6; H, 4.6; N, 13.7. Found (percent): C, 68.2; H, 4.8; N, 13.6.

EXAMPLE 9

170 parts of the potassium salt of o-hydroxyacetophenone and 76 parts of 3,3-bischloromethyloxetane were stirred for 4 hours at 130° C. After cooling, 100 parts of methylene chloride were added and the potassium chloride was filtered off. After removal of the methylene chloride the solid residue was recrystallized from carbon tetrachloride.

Yield—38%
Melting point—113° C.

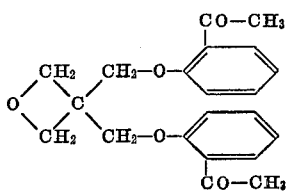

*Analysis.*—Calculated for $C_{21}H_{22}O_5$ (percent): C, 71.2; H, 6.2. Found (percent): C, 70.3; H, 6.5.

The structure of the compound was verified by the NMR-spectrum.

14.1 parts of the 3,3 - bis-(o-acetylphenoxymethyl)-oxetane obtained and 10 parts of 7-phenyl-heptatrienal dissolved while slightly heating in a mixture of 90 parts of absolute tetrahydrofuran and 40 parts of absolute ethanol. At a temperature of 330° C., a solution of 0.3 part of sodium in 4 parts of absolute ethanol was dropped into the solution obtained.

After standing for 12 hours at room temperature the solution was concentrated under reduced pressure, the residue was taken up in benzene and washed with water. The benzene phase was separated, dried over sodium sulfate and filtered. The benzene solution was subjected to chromatography with aluminum oxide ($Al_2O_3$, stage of activity I, neutral) with elution by passing benzene. The benzene solution was concentrated under reduced pressure and the solid residue was recrystallized from ethanol.

Yield—38%
Melting point—129–131° C.

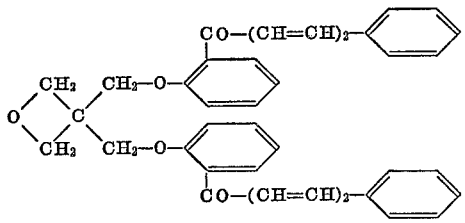

*Analysis.*—Calculated for $C_{39}H_{34}O_5$ (percent): C, 80.4; H, 5.9. Found (percent): C, 79.0; H, 6.1.

The structure of the compound was verified by the NMR-spectrum.

EXAMPLE 10

45 parts of the potassium salt of p-hydroxybenzaldehyde and 150 parts of 3,3-bischloromethyloxetane were stirred for 5 hours at 150° C. After cooling, the potassium chloride was filtered off and the excess of 3,3-bischloromethyloxetane was removed from the filtrate by distillation under reduced pressure. The residue was likewise subjected to a distillation under reduced pressure.

Boiling point—190–195° C. under 0.3 mm. of Hg
Melting point—34–35° C.
Yield—62%

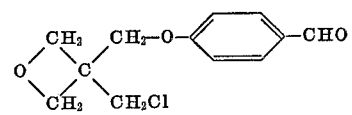

*Analysis.*—Calculated for $C_{12}H_{13}ClO_3$ (percent): C, 59.7; H, 5.4; Cl, 14.7. Found (percent): C, 59.4; H, 5.5; Cl. 14.5.

15.5 parts of the 3-chloromethyl-3-(p-formyl)-phenoxymethyloxetane obtained and 12 parts of piperonylidene acetone were dissolved in 220 parts of ethanol and while stirring at room temperature 30 parts of 2 N sodium hydroxide solution were dropped in. The reaction mixture was stirred for a further 5 hours at room temperature and then cooled to 0° C. The solid was filtered off with suction, washed with water and recrystallized from ethanol.

Yield—86%
Melting point—110–112° C.

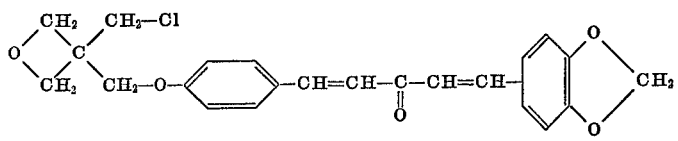

*Analysis.*—Calculated for $C_{23}H_{21}ClO_5$ (percent): C, 67.0; H, 5.1; Cl. 8.6. Found (percent): C, 66.8; H, 5.3; Cl, 8.2.

EXAMPLE 11

Over a period of 50 minutes, 43 parts of 2 N sodium hydroxide were added dropwise, at room temperature, and with stirring, to a solution of 22 parts of 3-chloromethyl-3-(p-formyl)-phenoxymethyloxetane and 20 parts of 9-acetylanthracene in 60 parts of ethanol. The reaction mixture was stirred for a further 3 hours at room temperature, the precipitate was filtered off with suction, washed with ethanol, dried and recrystallized from dioxan.

Yield—98%
Melting point—167° C.

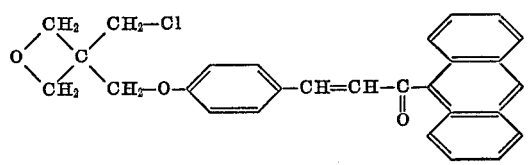

*Analysis.*—Calculated for $C_{28}H_{23}ClO_3$ (percent): C, 76.0; H, 5.2; Cl, 8.0. Found (percent): C, 75.9; H, 5.4; Cl, 8.0.

EXAMPLE 12

70 parts of the potassium salt of p-hydroxybenzaldehyde and 60 parts of 3-ethyl-3-chloromethyloxetane were stirred for 7 hours at 150° C. After cooling, the potassium chloride was filtered off and the filtrate was distilled under reduced pressure.

Boiling point—175–180° C. under 0.1 mm. Hg
Yield—72%

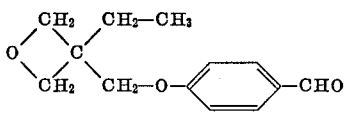

*Analysis.*—Calculated for $C_{13}H_{16}O_3$ (percent): C, 70.9; H, 7.3. Found (percent): C, 70.4; H, 7.4.

22 parts of the 3-ethyl-3-(p-formylphenoxymethyl)-oxetane obtained and 17 parts of cinnamylidene acetone were dissolved in 80 parts of ethanol. 40 parts of 2 N sodium hydroxide solution were dropped in at room temperature while stirring. The reaction mixture was stirred for another 4 hours and then cooled at 0° C. The solid matter was filtered off with suction, washed with water and recrystallized from ethanol.

Yield—52%
Melting point—120–121° C.

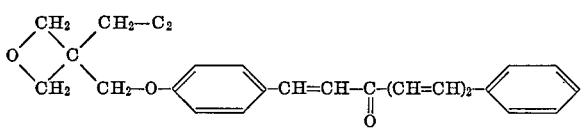

*Analysis.*—Calculated for $C_{25}H_{26}O_3$ (percent): C, 80.2; H, 7.0. Found (percent): C, 79.9; H, 7.1.

EXAMPLE 13

80 parts of the potassium salt of p-hydroxybenzaldehyde and 38.8 parts of 3,3-bischloromethyloxetane were stirred for 3 hours at 130° C. After cooling, the solution was diluted with 50 parts of methylene chloride and the potassium chloride was filtered off. After removal of the methylene chloride the solid residue was recrystallized from ethanol.

Melting point—128–130° C.

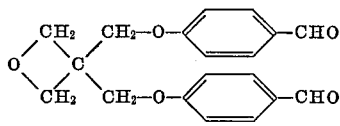

*Analysis.*—Calculated for $C_{19}H_{18}O_5$ (percent): C, 70.0; H, 5.5. Found (percent): C, 69.6; H, 5.5.

16.3 parts of the 3,3-bis-(p-formylphenoxymethyl)-oxethane obtained and 14.6 parts of benzylidene acetone were dissolved in 240 parts of ethanol and at room temperature 40 parts of 3 N sodium hydroxide solution were dropped in while stirring. The reaction mixture was stirred for another 2 hours, the solid matter was filtered off with suction, washed with water and recrystallized from toluene.

Yield—86%
Melting point—180–182° C.

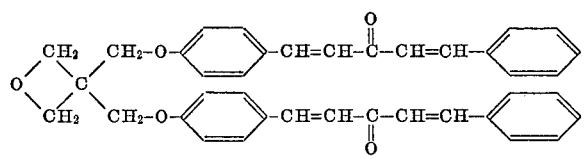

*Analysis.*—Calculated for $C_{39}H_{34}O_5$ (percent): C, 80.5; H, 5.9. Found (percent): C, 79.9; H, 5.9.

EXAMPLE 14

40 parts of the potassium salt of p-hydroxybenzophenone and 43 parts of 3-chloromethyl-3-(p-acetyl)-phenoxymethyloxetane were stirred for 4 hours at 140° C. The solution was cooled and diluted with 50 parts of methylene chloride. The potassium chloride was filtered off, the methylene chloride was removed and the solid residue was recrystallized from ethanol.

Yield—58%
Melting point—95° C.

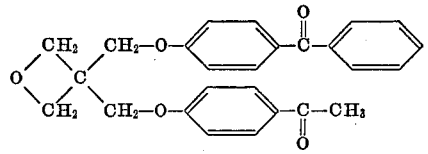

*Analysis.*—Calculated for $C_{26}H_{24}O_5$ (percent): C, 74.3; H, 6.0. Found (percent): C, 74.1; H, 6.2.

8.3 parts of the 3-(p-benzoyl)-phenoxymethyl-3-(-p-acetyl)-phenoxymethyloxetane obtained and 2.2 parts of benzaldehyde were dissolved in 80 parts of ethanol. 8 parts of 3 N sodium hydroxide solution were dropped in at room temperature while stirring. The reaction mixture was stirred for a further 5 hours and then cooled to 0° C. The solid matter was filtered off with suction, washed with water and recrystallized from isopropanol.

Yield—94%
Melting point—90° C.

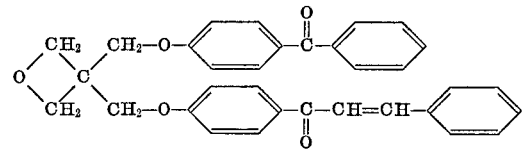

*Analysis.*—Calculated for $C_{22}H_{28}O_5$ (percent): C, 79.5; H, 5.55. Found (percent): C, 79.2; H, 5.7.

What is claimed is:
1. An oxetane of the formula

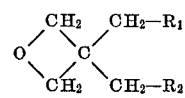

wherein $R_1$ is cinnamoyl, benzoyl-benzoxy, or substituted phenoxy of the formula

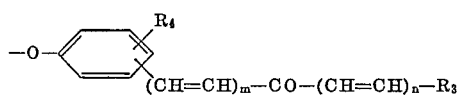

$R_2$ has the same meaning as $R_1$ or is methyl, chloromethyl, ethyl, benzoylphenoxy, or chlorine; $R_3$ is hydrogen, methyl, or phenyl when $m$ and $n$ are zero, is β-chlorostyryl or β-phenylstyryl when $m$ is zero and $n$ is 1, and is phenyl or furyl when $m$ is zero or 1 and $n$ is an integer from 1 to 6; and $R_4$ is hydrogen or halogen.

2. An oxetane of the formula

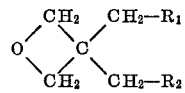

wherein $R_1$ is phenoxy substituted in the paraposition by an omega-aryl substituted butadiene-carboxyl group, said aryl substituent being p-methoxyphenyl, 2-furyl, phenyl, 4,5-diphenylbutadienecarboxy, or 4-chloro-5-phenylbutadiene-carboxy; and $R_2$ has the same meaning as $R_1$ or is methyl, ethyl, or chlorine.

3. An oxetane of the formula

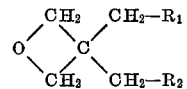

wherein $R_1$ is phenoxy, substituted in the paraposition by para-isopropylcinnamoyl, para-methoxycinnamoyl, meta-nitro-cinnamyl, or meta-azidocinnamoyl; and $R_2$ is chlorine or ethyl.

4. An oxetane as in claim 1, wherein $R_1$ is
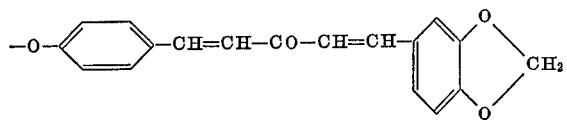
and $R_2$ is chlorine.
5. An oxetane as in claim 1, wherein $R_1$ and $R_2$ are each
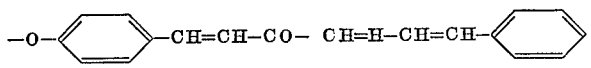
6. An oxetane of the formula
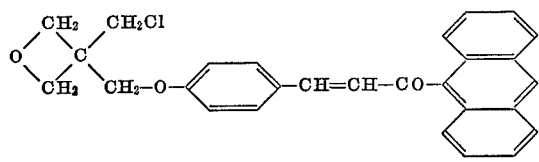
7. An oxetane of the formula
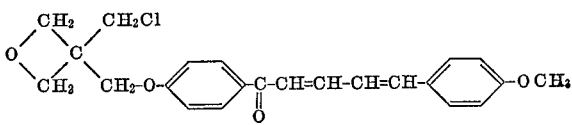
References Cited
FOREIGN PATENTS
1,021,858   7/1958   Germany.
OTHER REFERENCES
Farthing: J. Chem. Soc., 1955, pp. 3648 to 3654.
Piganiol, P., et al.: Bull. Soc. Chim., France, 1961, pp. 255 to 260.
JOHN D. RANDOLPH, Primary Examiner
U.S. Cl. X.R.
260—88.3, 47, 333